March 14, 1939. M. J. SCHENK Re. 21,031

LUBRICATION SYSTEM FOR INTERNAL COMBUSTION ENGINES

Original Filed Oct. 17, 1929 4 Sheets-Sheet 1

Inventor:
Martin J. Schenk,
By
Jesse B. Keller
Attorney.

March 14, 1939. M. J. SCHENK Re. 21,031

LUBRICATION SYSTEM FOR INTERNAL COMBUSTION ENGINES

Original Filed Oct. 17, 1929 4 Sheets-Sheet 2

Inventor
Martin J. Schenk,
By
Jesse B. Heller.
Attorney.

March 14, 1939. M. J. SCHENK Re. 21,031

LUBRICATION SYSTEM FOR INTERNAL COMBUSTION ENGINES

Original Filed Oct. 17, 1929 4 Sheets-Sheet 3

Inventor
Martin J. Schenk
By
Jesse B. Heller
Attorney.

March 14, 1939. M. J. SCHENK Re. 21,031

LUBRICATION SYSTEM FOR INTERNAL COMBUSTION ENGINES

Original Filed Oct. 17, 1929 4 Sheets-Sheet 4

Inventor
Martin J. Schenk
By
Jesse B. Heller
Attorney

Reissued Mar. 14, 1939 Re. 21,031

UNITED STATES PATENT OFFICE 21,031

LUBRICATION SYSTEM FOR INTERNAL COMBUSTION ENGINES

Martin J. Schenk, Chicago, Ill., assignor, by direct and mesne assignments, of thirty-three and one-third per cent to R. Picard, Chicago, Ill.

Original No. 1,815,868, dated July 21, 1931, Serial No. 400,383, October 17, 1929. Application for reissue December 27, 1938, Serial No. 248,009

22 Claims. (Cl. 184—6)

This invention relates to an improvement in lubricating and valve cooling systems for internal combustion engines, and more particularly to that type of radial air cooled engine which has come into such wide commercial and military use.

Engines of this type have been generally accepted as the most practical type of engine for aeroplanes, and their acceptance has been due to the fact that they furnish a maximum of power per pound of engine weight, their lightness being due to the lesser amount of metal needed in the cylinders than in engines of the water cooled type, and to the fact that no cooling radiators and fluid are necessary. However, certain drawbacks to the use of radial engines have been encountered and chief among these are the difficulty in properly lubricating the entire valve gear and properly cooling the valves.

These drawbacks have been such as to necessitate the disassembly of the entire valve gear after every fifteen hours of flying time in order to thoroughly lubricate the same and have further made it necessary to completely overhaul the engine after 200 hours of use in order to grind the valves, and replace any such valves as may have become burned or warped. It has been impossible, up to the present time, to carry out any long sustained flights without rigging up an auxiliary lubricating device for the valves which can be controlled from the cockpit of the plane, or lubricating the valves with a manually operated pressure gun, which means that it is necessary for the flight mechanic to climb out of the cockpit of the plane to the engine and attach the gun to each of the lubricating nipples provided on the rocker arms of the valve gear. These expedients have proved both inefficient and dangerous, as it is impossible to thoroughly lubricate all parts of the valve gear by these methods.

The object of my invention is to overcome the above-mentioned troubles and to thoroughly lubricate the valve gear and cool the valves automatically.

Further my improvement is made an integral part of the lubrication system now embodied in the type of engine referred to and is so arranged as to be applicable to engines now in service with but few changes of parts.

The above object is attained by forcing oil, under pressure, to all parts of the valve gear and to the valves in order to cool the same, after which the oil is returned to the storage tank. The oil is fed to the system from the pump now employed in the usual lubrication system which has heretofore been confined to the crank case of the engine.

A complete understanding of my invention may be had by reference to the accompanying drawings, of which:

Figure 1:
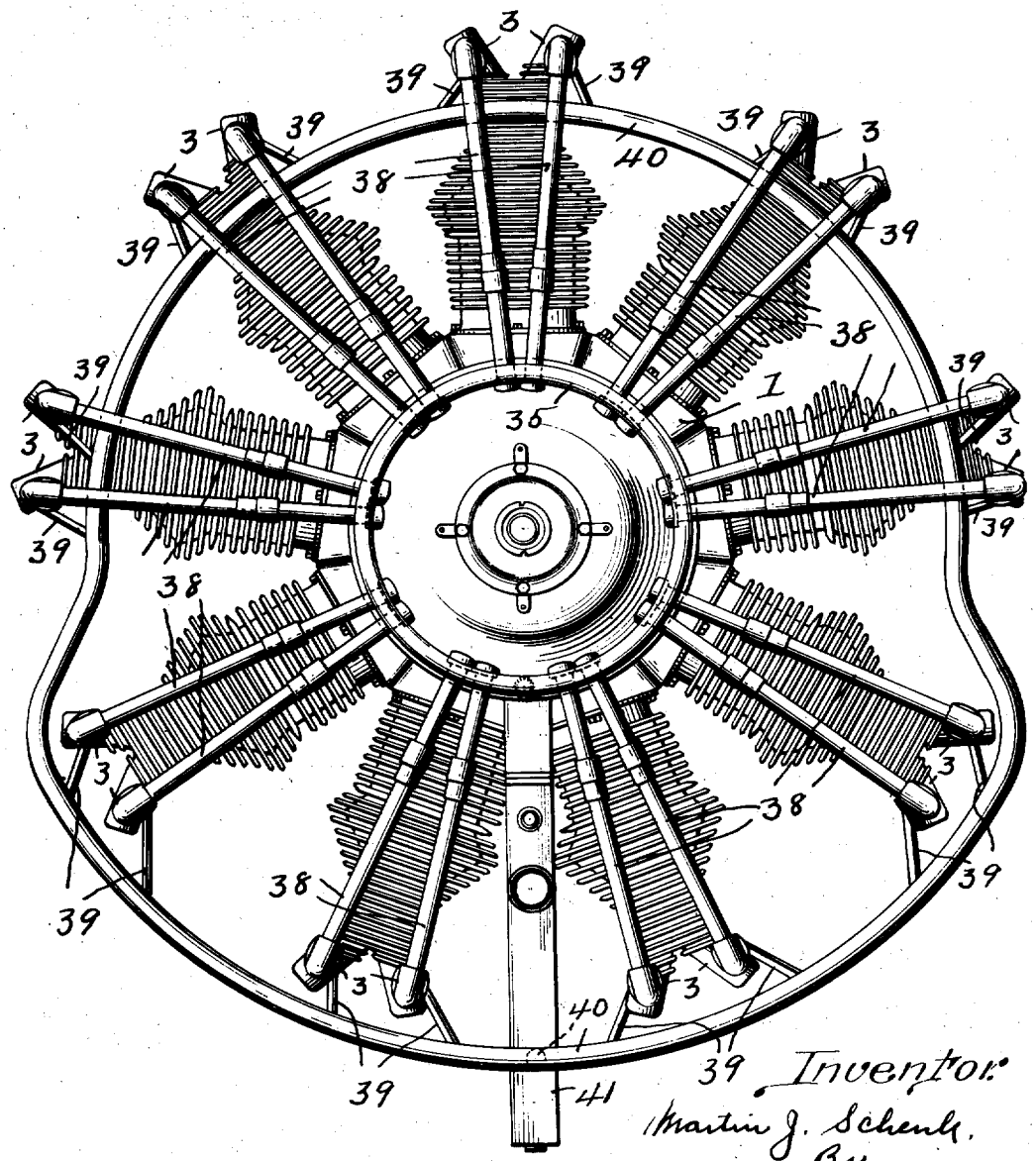
Fig. 1 is a face view of an engine embodying my improvement.

My invention is illustrated as applied to a nine cylinder, radial, air-cooled engine in which the crank case is designated by the numeral 1, the cylinders, which are disposed radially about the crank case, as 2 and the rocker arm boxes as 3, there being two such boxes to each cylinder, one for the exhaust valve and one for the intake valve. Inasmuch as the mechanism operating each valve and the system for lubricating such mechanism is the same throughout the engine it will only be necessary to describe the mechanism as applied to a single valve.

Each box is provided with an oil tight cover 4 which can be removed to permit adjustments to the valves, the remainder of the valve box being cast integral with the cylinder head. Within each rocker arm box is a rocker arm 5 pivoted about a shaft 6 so as to operate the valve 7 which is normally held in a closed position by springs 8. Each rocker arm is operated by means of a hollow push rod 9 having a rounded head 10 which is drilled to permit the passage of oil therethrough. The oil passage in the push rod communicates with an oil passage 11 in the rocker arm, which passage also feeds the roller bearing on which the rocker arm is journaled, and the valve adjusting means which consists of a threaded screw member 12 having a hemispherical concavity in the lower end thereof. The screw member 12 is held in its adjusted position by means of a locking nut 13 and is provided with an annular groove 14 about its median portion which communicates with oil passages within the screw member and with the oil passage 11 in the rocker arm. Between the lower end of the adjusting screw 12 and the top of the valve 7 there is provided a friction reducing member 15 having an oil passage therethrough. This anti-friction member is rounded on top to coincide with the concavity in the adjusting screw 12 and is provided with a plane surface on the bottom for engagement with the stem of the valve 7.

Figure 8:
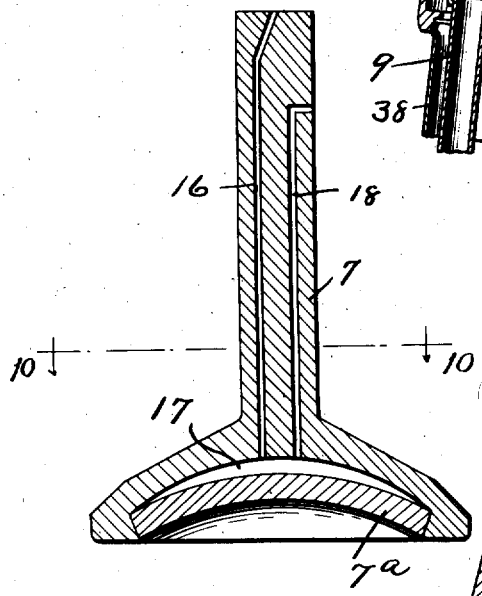
Fig. 8 is a longitudinal section of a valve showing the oil circulating passages.
Figure 7:
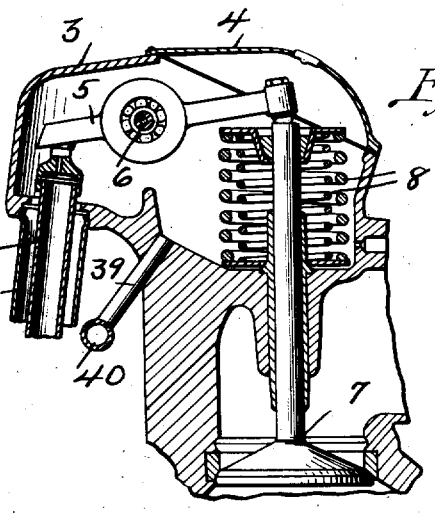
Fig. 7 is a detail view in section, showing the valve gear for one valve on the cylinder head.
Figure 9:
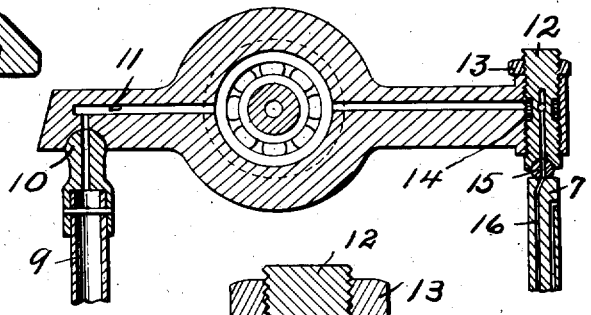
Fig. 9 is a section through one of the valve rocker arms.
Figure 10:
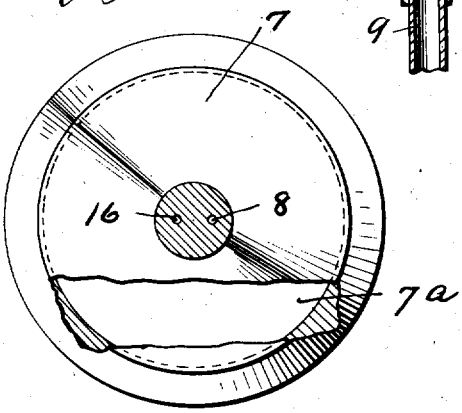
Fig. 10 is a section through line 10—10 of Fig. 8.
Figure 11:
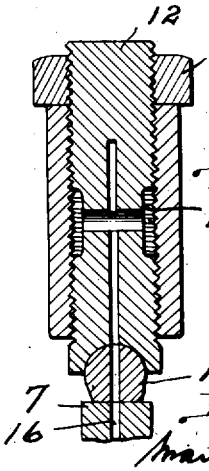
Fig. 11 is a section through the valve adjusting means showing the oil passages therein.

The valve 7 has been specially designed to meet the need for a valve which can be readily cooled, and to this end is so constructed as to permit the passage of cooling oil therethrough. The valve is provided with an inlet passage 16, a hollow chamber 17 in the head and an outlet passage 18. By reference to Figs. 8, 9 and 10, the details of the valve construction are readily apparent.

The main portion of the valve consisting of the stem and head is first formed, the oil passages 16 and 18 are then drilled in the stem, after which a disc 7a is pressed into the cavity 17, and forms an oil tight joint with the undercut shoulder on the valve.

The hollow push rod 9 is provided at its lower extremity with an anti-friction member 18a having a rounded end which engages in a concavity in the top of a cam follower. The member 18a is also drilled to permit the passage of oil therethrough. The cam follower consists of upper and lower parts 19 and 20 between which is placed the spring 21. The upper portion 19 of the cam follower has drilled therein the cylindrical cavity 23. The lower portion 20 of the cam follower is turned down to form the protuberance 24 which fits into the cavity 23 in which is placed the spring 21. The upper part of the cam follower is drilled to form the oil passages 22 and the lower part is drilled to form the connecting passages 25 and 26. The cam is designated by the letter C and the cam follower and the rest of the valve gear is operated through the medium of the roller 27 journaled on a shaft 28 which in turn is mounted in a slot in the lower portion of the cam follower. Oil is supplied to the roller by means of the grooves 29 in the cam follower and the passage 30 in the shaft 28.

The cam follower is slidably mounted in the housing 31 which is fixed in the crank case 1 and is restrained against rotation by pin 21a. Through the housing 31 is drilled a passage 32 for the return of oil to the crank case. The housing 31 is further provided with a hollow internally threaded pipe connection 33, into which is threaded a connection 34 communicating with a manifold 35. Within the connection 33 is placed a ball check 36 which is prevented from closing the port to the oil passages in the cam follower by means of a pin 37.

Between the top of the cam follower housing and the bottom of the rocker arm box 3 there is provided a telescoping push rod cover 38, which can readily be applied to the push rod between the cylinder and the cam follower housing.

From the lowest portion of each rocker arm box a pipe 39 leads to a manifold 40 for returning the oil which has been through the system back to an oil sump 41 from which it is drawn through the strainer 42 and a pipe 43. The sump is provided at its lowest extremity with a drain plug through which accumulated dirt and water which has entered the system may be withdrawn.

This manifold 40 surrounds the crank shaft, the upper portion lying between the rocker arm boxes 3 and the crank shaft, while the lower portion of the manifold is outside of the boxes 3, so that each of the boxes 3 is above an adjacent portion of the manifold, whereby the oil is drained by gravity from each of the boxes 3 to the manifold 40 through its pipe 39, see Fig. 1.

Figure 2:
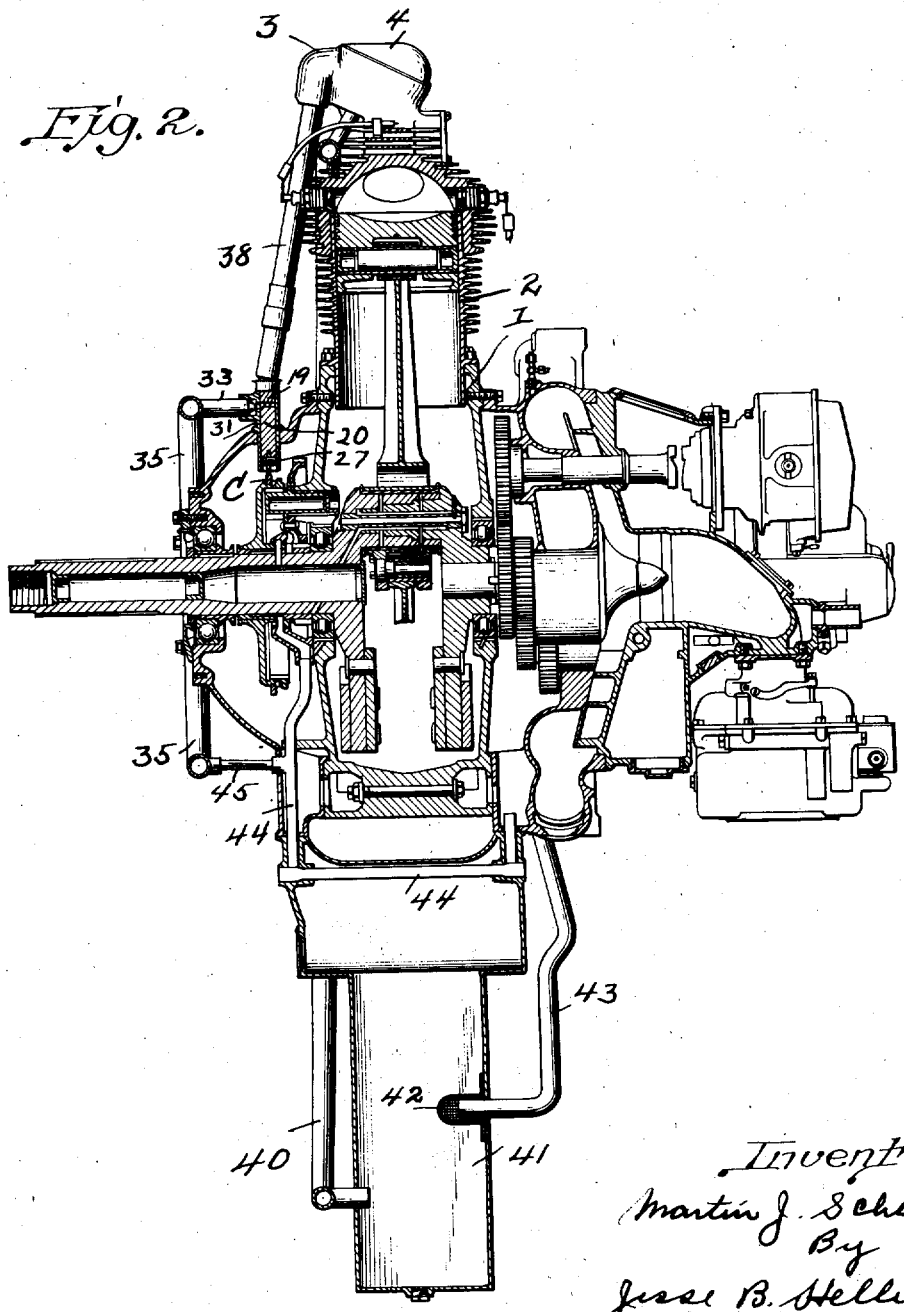
Fig. 2 is a vertical section of the same engine.

Within the crank case 1 is shown a pipe 44 (Fig. 2) carrying oil from the usual pump (not shown) to the crank shaft. From this pipe 44 is led another pipe 45 which feeds oil to the manifold 35.

Having described the various parts of my improved system in detail, I shall now proceed to describe the operation of the system in its entirety.

Figure 3:
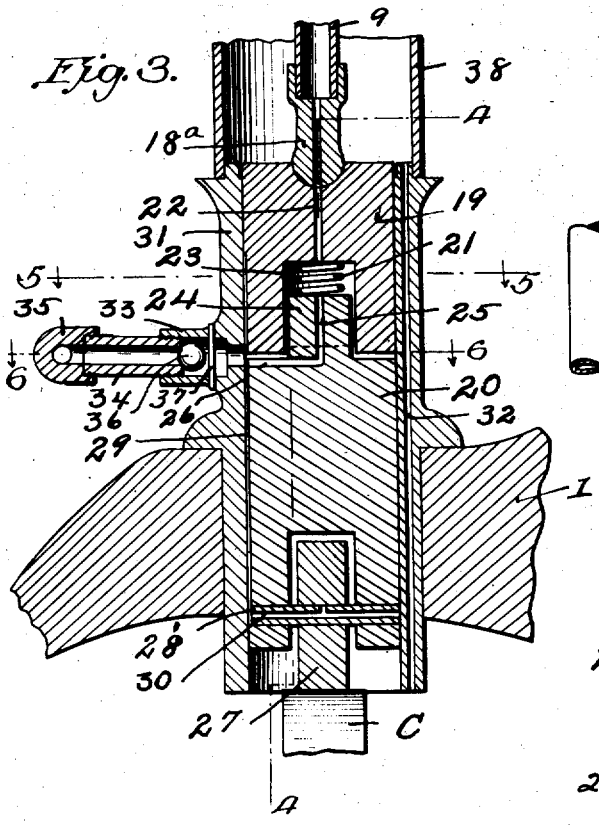
Fig. 3 is a vertical section through a cam follower.
Figure 5:
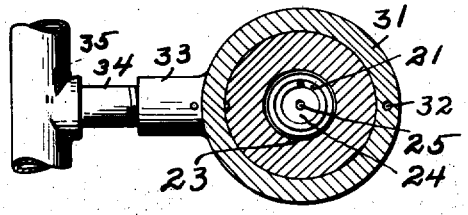
Fig. 5 is a section through line 5—5 of Fig. 3.
Figure 4:
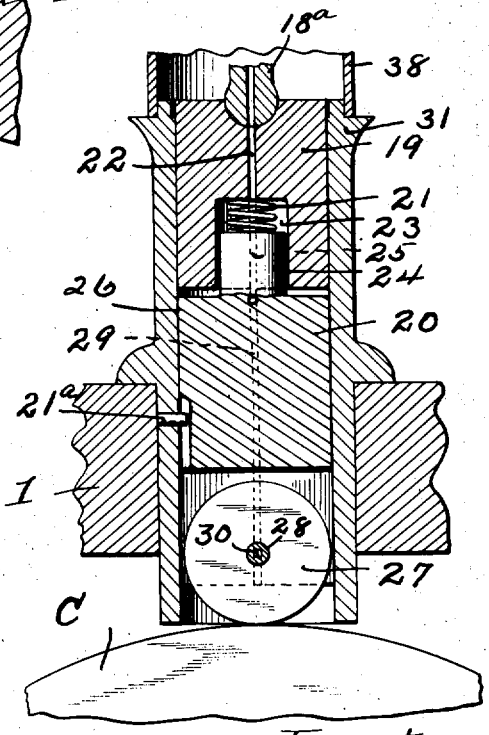
Fig. 4 is a section through line 4—4 of Fig. 3.
Figure 6:
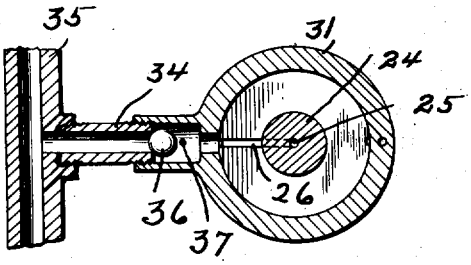
Fig. 6 is a section through line 6—6 of Fig. 3.

As before stated, the oil under pressure is conveyed under pressure from the usual pump to the crank shaft and allied parts through pipe 44 but as this does not form a part of my invention it will be unnecessary to describe the same. From the pipe 44 the oil is also conveyed to the manifold 35, which is on the outside of the crank case, by means of the pipe 45. From the manifold 35 outlets are provided to each of the cam follower housings 31, the ball checks 36 being unseated by the oil, see Fig. 3. After the oil has entered the housing 31 part of it passes through the groove 29 in the lower portion of the cam follower downwards to lubricate the roller 27, some of the oil leaking out and lubricating the face of the cam C. The remainder of the oil enters the passages 25 and 26 which discharge into the cavities 23. From the cavities 23 the oil passes through passages 22 in the upper portions of the cam followers, lubricates the friction surfaces between the cam followers and the lower ends 18a of the push rods. The oil now flows up through the hollow push rods 9 by means of the passages in the upper extremities of the push rods, the oil passes into and through the passages 11 in the rocker arms 5 lubricating the friction surfaces between the upper ends of the push rods and the rocker arms and also the roller bearings in which the rocker arms are journaled, from the passages 11 the oil is conveyed through the passages in the valve adjusting screws 12 and from thence through the passage in the anti-friction members 15 between the adjusting screws and the tops of the valve stems. The oil then passes through the intake channels 16 in the valve stems, circulates within the hollow chambers 17 of the valves and cools the same and then flows through the passages 18 and is discharged into the valve boxes, thereby lubricating the valve stems.

From the valve boxes the oil flows through the drain tubes 39, placed in the lowest portions of the valve boxes, into the manifold 40 and thence to the oil sump 41 from which it is drawn through pipe 43 by means of a scavenge pump (not shown) and is returned to the oil reservoir in the fuselage of the plane. The return pipe 43 must necessarily be placed below the level of the rocker boxes of the lowermost cylinders in order to prevent the flooding of the rocker boxes. Any oil which may have found its way into the push rod covers 38 of the top cylinders will drain by gravity into the crank case by way of the oil passage 32 drilled in the cam follower housings and from the crank case to the sump in the usual manner.

The lower portions of the cam followers are held against the cam by means of the spring 21 within the followers. This spring will also cause the upper portions of the cam followers to be held against the lower ends of the push rods, the upper ends of the push rods against the rocker arms and finally the opposite ends of the rocker arms against the tops of the valve stems. This construction, it will readily be seen, prevents the leaking of the oil at the points referred to other than that necessary to properly lubricate the friction surfaces. The springs 21 are of the compression type and operate against the force of the springs 8 which hold the valves in their closed positions. The force of the springs 21 is only about six pounds apiece whereas the force of the springs 8 total about 45 pounds when the valves are closed and about 70 pounds when the valves are held open by the cam and intermediate valve gear so that the action of the springs 21 can in no way interfere with the normal operation of the valves.

There is provided in the valve gear a certain amount of play to compensate for the expansion of the cylinders, push rods and cam followers, enough play being allowed so that there exists about .01" between the members 15 and the valve stems when the motor is cold and about .06" when the motor is hot. As can readily be seen, this play is all taken up between the upper and lower portions 19 and 20 of the cam followers and is apt to form a slight pumping action which would act against the force of the oil pump. This reaction against the pump is prevented by the ball check 36 in each of the cam follower housings, which, in event of any back pressure will seat against the ends of the pipes 34. It is preferable to allow more clearance than above specified and to increase the cam lift proportionately so that a greater pumping action is caused between the upper and lower portions of the cam followers thus creating a greatere pressure to exist in the system between the ball checks and the outlets in the valve stems. It is also evident that the springs 21 and the oil in the chambers 23 will provide a cushioning effect on the various parts of the valve gear as the valves are actuated.

From the foregoing description it is evident that my improvement will thoroughly and adequately lubricate all parts of the valve gear and cool the valves so that flights of the longest duration can be safely carried out without fear of motor failure due to insufficient lubrication and the life of a motor between overhauls can be lengthened from 200 hours to 1000 hours of flying time. While I have, in the foregoing description, described my invention in its preferred form, it is evident that many changes might be made in its construction and operation without departing from the scope of the invention.

Having now described my invention, what I claim and desire to secure by Letters Patent is:

1. A lubricating system for internal combustion engines, having valves, a rocker arm for each valve, a push rod for each rocker arm, means for actuating the push rod, a lubricant supply, means for delivering lubricant under pressure to the joints between the rocker arm and push rod and the valve and rocker arm and back to the supply, and other means for increasing the pressure of the lubricant delivered to the joints when the push rod is moved in one direction, without affecting the pressure in the supply.

2. A lubricating system for internal combustion engines, having valves, a rocker arm for each valve enclosed within a chamber, a push rod for each rocker arm, a lubricant supply, and means for delivering lubricant under pressure to the joints between the rocker arm and push rod and the valve and rocker arm and from there to its chamber, and means for returning oil from each chamber back to the supply.

3. A lubricating system for internal combustion engines having a plurality of radially disposed cylinders surrounding the crank shaft, valves for each cylinder, a rocker arm for each valve, a casing for each rocker arm, a push rod for each valve, a lubricant source, a lubricant supply means for delivering lubricant under pressure from the lubricant source to the joints between each push rod and its rocker arm and each valve and its rocker arm, and a downwardly extending drain from each casing for returning the lubricant back to said source.

4. A lubricating system for internal combustion engines having a plurality of radially disposed cylinders surrounding the crank shaft, valves for each cylinder, a rocker arm for each valve enclosed within a chamber, a push rod for each rocker arm, a manifold surrounding the crank shaft, a source of lubricant supply, means for delivering lubricant under pressure from said source to said manifold, connections from said manifold for delivering lubricant to the joints between each rocker arm and its push rod and each rocker arm and its valve, and downwardly extending connections from each rocker arm chamber back to the source of lubricant.

5. A lubricating system for internal combustion engines having a plurality of radially disposed cylinders surrounding the crank shaft, valves for each cylinder, a rocker arm for each valve enclosed within a chamber, a push rod for each rocker arm, a manifold surrounding the crank shaft, a source of lubricant supply, means for delivering lubricant under pressure from said source to said manifold, connections from said manifold for delivering lubricant to the joints between each rocker arm and its push rod and each rocker arm and its valve, a second manifold surrounding the crank shaft, a downwardly extending lubricant return connection from each rocker arm chamber to said second manifold to drain said chamber by gravity, and a common lubricant connection from the second manifold to the source of lubricant.

6. A lubricating system for internal combustion engines having reciprocating valves, a rocker arm for each valve, a bearing for the rocker arm, a hollow push rod for the rocker arm, means for actuating the push rod, a passage for lubricant in the rocker arm communicating with the hollow push rod and the bearing, a second passage for lubricant in the rocker arm communicating with the bearing and the joint between the rocker arm and the end of the valve stem, means for causing lubricant to first flow through the push rod and then through the rocker arm to the joint between the valve stem and rocker arm and other means for increasing the pressure of the lubricant in the system when the push rod is moved in one direction.

7. A lubricating system for an internal combustion engine valve gear having a reciprocating valve provided with a stem, a rocker arm for actuating the valve, a bearing in the rocker arm, a hollow push rod for actuating the rocker arm, passages for lubricant within the rocker arm communicating with the hollow push rod, means for actuating the push rod, the bearing and the joint between the valve stem and rocker arm, there being a chamber in the valve, a passage in the valve stem communicating with the passage in the rocker arm at the joint between the rocker arm and stem, there being an outlet passage from the chamber in the valve stem, means for continuously forcing lubricant through the said passages and the chamber in the valve for cooling the valve and lubricating the rocker arm bearing, the joints between the rocker arm and push rod and the joint between the rocker arm and the valve stem, means for causing lubricant to first flow through the push rod and then through the rocker arm to the joint between the valve stem and rocker arm, and other means for increasing the pressure of the lubricant in the system when the push rod is moved in one direction.

8. A lubricating system for internal combustion engine valve gear for a reciprocating valve, comprising a rocker arm for opening the valve, a push rod for actuating the rocker arm, a cam, a two part follower between the cam and push rod, a housing for the follower parts, a relatively light spring between the follower parts, a relatively heavy spring for moving the valve to its closed position, the light spring tending to separate the follower parts and maintain the valve gear elements in engagement with each other and with the valve, there being a space between said follower parts when the valve is closed, adjustable means for varying the size of such space, means for feeding lubricant to said space, a check valve for preventing the retrograde movement of lubricant from said space when the follower parts are moved towards each other, there being lubricant passages from said space to the joints between the rocker arm and the push rod and the joint between the valve and rocker arm, whereby lubricant is continuously delivered to said joints by the combined action of the lubricant feeding means and the relative movement of the follower parts.

9. A lubricating system for internal combustion engine valve gear for a reciprocating valve, comprising a rocker arm for opening the valve, a push rod for actuating the rocker arm, a cam, a two part follower between the cam and push rod, a housing for the follower parts, a relatively light spring between the follower parts, a relatively heavy spring for moving the valve to its closed position, the light spring tending to separate the follower parts and maintain the valve gear elements in engagement with each other and with the valve, there being a space between said follower parts when the valve is closed, adjustable means for varying the size of such space, means for feeding lubricant to said space, a check valve for preventing the retrograde movement of lubricant from said space, there being a continuous lubricant passage from said space through the push rod, and the rocker arm to the joint between the rocker arm and the valve, said two part follower acting as a pump when the push rod is moved in one direction.

10 A lubricating system for internal combustion engine valve gear for a reciprocating valve having a stem and a head, comprising a rocker arm for opening the valve, a push rod for actuating the rocker arm, a cam, a two part follower between the cam and push rod, a housing for the follower parts, a relatively light spring between the follower parts, a relatively heavy spring for moving the valve to its closed position, the light spring tending to separate the follower parts and maintain the valve gear elements in engagement with each other and with the valve, there being a space between said follower parts when the valve is closed, adjustable means for varying the size of such space, means for feeding lubricant to said space, a check valve for preventing the retrograde movement of lubricant from said space, there being a chamber in the valve head, an outlet passage leading from said chamber, there being continuous lubricant passages from said space between the follower parts through the push rod, the rocker arm and valve stem to the chamber in the valve, whereby lubricant is continuously delivered to all of the joints of the valve gear for lubricating said joints and through the chamber in the valve for cooling the valve, said two part follower acting as a pump when the push rod is moved in one direction.

11. A lubricating system for reciprocating valves of an internal combustion engine having a stem, a rocker arm for moving the stem, a push rod for actuating the rocker arm, a follower, a cam for actuating the follower, a roller mounted in the follower in engagement with the cam, a housing for the follower, means for delivering lubricant to the housing, there being an oil passage for delivering lubricant from the housing to the roller, and there also being a continuous lubricant passage from said housing through a portion of the follower, the push rod and the rocker arm to the joint between the rocker arm and the valve stem.

12. A lubricating system for internal combustion engine valve gear for a reciprocating valve including a two part follower, a housing for the follower, means for adjusting the valve gear to provide a space between the follower parts when the valve is closed, means for supplying oil to the space between the follower parts, oil connections from said space to the joints in the valve gear, means for moving one of said parts toward the other and then actuating the valve, and means for preventing the movement of the oil from between said parts to the oil supply means, whereby said oil is forced through the oil connections to the joints in the valve gear.

13. A two part follower for a valve gear lubricating system, a housing for the follower parts, means for supplying oil under pressure within the housing between the follower parts, means for conducting oil from between said follower parts to the joints of the valve gear, means for actuating the follower parts, and means for preventing the oil from flowing into the supply means when the follower parts are moved toward each other, whereby the pressure of the oil in the system between the housing and the joints of the valve gear is increased.

14. A lubricating system for internal combustion engines having a plurality of radially disposed cylinders surrounding the crank shaft, valves for each cylinder, valve actuating mechanism for each valve, a follower for actuating each valve mechanism, housings enclosing the valve mechanisms and followers, means for conducting oil from each follower casing to the joints of the valve mechanism associated therewith, means for supplying oil to each follower casing, and means for conducting by gravity back to the oil supply means oil leakage from the joints of the valve actuating mechanisms.

15. A lubricating system for internal combustion engines having a plurality of radially disposed cylinders surrounding the crank shaft, valves for each cylinder, there being a separate chamber inclosing each valve actuating mechanism, a follower for actuating each valve mechanism, a housing inclosing each follower, means for delivering oil under pressure to each follower housing, means for delivering oil from each housing to the joints of the valve mechanism actuated thereby, a manifold surrounding the crank shaft of the engine, means for conducting the oil by gravity from each valve mechanism chamber to said manifold, and means for returning the oil from the manifold to the oil delivery means.

16. A lubricating system for internal combustion engines having a plurality of radially disposed cylinders surrounding the crank shaft, valves for each cylinder, valve actuating mechanism for each valve, each of said valve actuating mechanisms being enclosed within a casing, means for delivering oil under pressure to each valve actuating mechanism, a return oil manifold surrounding the crank shaft, the upper portion of said manifold lying between the valve mechanism chambers and the crank shaft while the lower portion thereof is beyond the lower valve mechanism chambers, drain pipes extending downwardly from each of said chambers to the manifold, and means for returning oil from the manifold to the supply.

17. An automatic valve gear lubricating system for internal combustion engines of the radial type having a centrally arranged crankcase, a plurality of radially disposed air-cooled cylinders surrounding the crankcase, valves for each cylinder, and valve-actuating mechanism for each valve including a hollow rocker arm at the outer end of each cylinder in operative engagement with the valve, a hollow radially disposed push rod in operative engagement with the rocker arm, a hollow cam follower in operative engagement with the push rod, and a guide for the cam follower, the push rods being located exteriorly of the cylinders in spaced relation to the latter, and the cam follower guides being located in the crankcase at the inner ends of the push rods; said lubricating system comprising means for supplying oil under pressure, means for conducting said oil to the cam followers through openings in the side of the cam follower guides, means for conducting said oil outwardly through the cam followers to joints of all the push rods and rocker arms, oil-tight enclosures for the rocker arms at the outer ends of the cylinders, oil-tight tubes extending between the rocker arm enclosures and the cam follower guides about the push rods in open communication with said enclosures, downwardly inclined pipes at the outer ends of the cylinders in communication at their upper ends with the lower portions of the rocker arm enclosures for draining by gravity from the enclosures oil discharged from joints of the valve-actuating mechanisms, a common oil return beneath the crankcase between the two lowermost rocker arm enclosures into which the oil drained through all of said pipes flows, and a pump for causing the oil from said return to flow back to the oil supply means for recirculation.

18. An automatic valve gear lubricating system for internal combustion engines of the radial type having a centrally arranged crankcase, a plurality of radially disposed air-cooled cylinders surrounding the crankcase, valves for each cylinder, and valve-actuating mechanism for each valve including a hollow rocker arm at the outer end of each cylinder in operative engagement with the valve, a hollow radially disposed push rod in operative engagement with the rocker arm, a hollow cam follower in operative engagement with the push rod, and a guide for the cam follower, the push rods being located exteriorly of the cylinders in spaced relation to the latter, and the cam follower guides being located in the crankcase at the inner ends of the push rods; said lubricating system comprising means for supplying oil under pressure, means for conducting said oil to the cam followers through openings in the sides of the cam follower guides, means for conducting said oil outwardly through the cam followers to joints of all the push rods and rocker arms, oil-tight enclosures for the rocker arms at the outer ends of the cylinders, oil-tight tubes extending between the rocker arm enclosures and the cam follower guides about the push rods in open communication with said enclosures, downwardly inclined pipes at the outer ends of the cylinders in communication at their upper ends with the lower portions of the rocker arm enclosures for draining by gravity from the enclosures oil discharged from joints of the valve-actuating mechanisms, a common oil return beneath the crankcase between the two lowermost rocker arm enclosures into which the oil drained through all of said pipes flows, and a pump for causing the oil from said return to flow back to the oil supply means for recirculation, the cam follower guides for all the cylinders which are located above the level of the center of the crankcase being provided with ducts leading downwardly from the lower ends of the push rod tubes into the crankcase, through which ducts the oil discharged from the push rod joints in the tubes flows by gravity into the crankcase.

19. An automatic valve gear lubricating system for internal combustion engines of the radial type having a centrally arranged crankcase, a plurality of radially disposed air-cooled cylinders surrounding the crankcase, valves for each cylinder, and valve-actuating mechanism for each valve including a hollow rocker arm at the outer end of each cylinder in operative engagement with the valve, a hollow radially disposed push rod in operative engagement with the rocker arm, a hollow cam follower in operative engagement with the push rod, and a guide for the cam follower, the push rods being located exteriorly of the cylinders in spaced relation to the latter, and the cam follower guides being located in the crankcase at the inner ends of the push rods, said lubricating system comprising means for supplying oil under pressure, means for conducting said oil to the cam followers through openings in the sides of the cam follower guides, means for conducting said oil outwardly through the cam followers to joints of all the push rods and rocker arms, oil-tight enclosures for the rocker arms at the outer ends of the cylinders, oil-tight tubes extending between the rocker arm enclosures and the cam follower guides about the push rods in open communication with said enclosures, downwardly inclined pipes at the outer ends of all the cylinders which are located below the level of the center of the crankcase, which pipes are in communication at their upper ends with the lower portions of the rocker arm enclosures of said cylinders for draining by gravity from said enclosures oil discharged from joints of the valve-actuating mechanisms of said cylinders, a common oil return beneath the crankcase between the two lowermost rocker arm enclosures into which the oil drained through all of said pipes flows, and a pump for causing the oil from said return to flow back to the oil supply means for recirculation, the cam follower guides for all the cylinders which are located above the level of the center of the crankcase being provided with ducts leading downwardly from the lower ends of the push rod tubes into the crankcase, through which ducts oil discharged from the push rod joints in the tubes flows by gravity into the crankcase.

20. An automatic valve gear lubricating system for internal combustion engines of the radial type having a centrally arranged crankcase, a plurality of radially disposed air-cooled cylinders surrounding the crankcase, valves for each cylinder, and valve-actuating mechanism for each valve including a rocker arm at the outer end of each cylinder in operative engagement with the valve, a hollow radially disposed push rod in operative engagement with the rocker arm, a hollow cam follower in operative engagement with the push rod, and a guide for the cam follower, the push rods being located exteriorly of the cylinders in spaced relation to the latter, and the cam follower guides being located in the crankcase at the inner ends of the push rods; said lubricating system comprising means for supplying oil, means for conducting said oil to the cam followers through openings in the sides of the cam follower guides, means for conducting said oil outwardly through the cam followers to joints of all the push rods and rocker arms, oil-tight enclosures for the rocker arms at the outer ends of the cylinders, oil-tight tubes extending between the rocker arm enclosures and the cam follower guides about the push rods, and means for conducting by gravity back to the oil supply means oil discharged from joints of the valve-actuating mechanisms of all the cylinders located above the level of the center of the crankcase, said last mentioned means including ducts in the cam follower guides for said cylinders, which ducts lead downwardly from the lower ends of the push rod tubes into the crankcase.

21. An automatic valve gear lubricating system for internal combustion engines of the radial type having a centrally arranged crankcase, a plurality of radially disposed air-cooled cylinders surrounding the crankcase, valves for each cylinder, and valve-actuating mechanism for each valve including a hollow rocker arm at the outer end of each cylinder in operative engagement with the valve, a hollow radially disposed push rod in operative engagement with the rocker arm, a hollow cam follower in operative engagement with the push rod, and a guide for the cam follower, the push rods being located exteriorly of the cylinders in spaced relation to the latter, and the cam follower guides being located in the crankcase at the inner ends of the push rods; said lubricating system comprising means for supplying oil under pressure, means for conducting said oil to the cam followers through openings in the sides of the cam follower guides, means for conducting said oil outwardly through the cam followers to joints of all the push rods and rocker arms, oil-tight enclosures for the rocker arms at the outer ends of the cylinders, oil-tight tubes extending between the rocker arm enclosures and the cam follower guides about the push rods in open communication with said enclosures, downwardly inclined pipes at the outer ends of the cylinders in communication at their upper ends with the lower portions of the rocker arm enclosures for draining by gravity from the enclosures oil discharged from joints of the valve-actuating mechanisms, a common oil return beneath the crankcase between the two lowermost rocker arm enclosures into which the oil drained through said pipes flows, and a pump for causing the oil from said return to flow back to the oil supply means for recirculation, the cam follower guides for all the cylinders which are located above the level of the center of the crankcase being provided with ducts leading downwardly from the lower ends of the push rod tubes into the crankcase, through which ducts oil discharged from the push rod joints in the tubes flows by gravity into the crankcase, each of said cam followers being made in two spring-expanded pump-like parts between which the oil entering from the opening in the side of the cam follower guide flows and is forced intermittently under momentarily increased pressure through the outer part of the cam follower into the push rod by the contraction of said parts incident to the operation of the engine.

22. An automatic valve gear lubricating system for internal combustion engines of the radial type having a centrally arranged crankcase, a plurality of radially disposed air-cooled cylinders surrounding the crankcase, valves for each cylinder, and valve-actuating mechanism for each valve including a hollow rocker arm at the outer end of each cylinder in operative engagement with the valve, a hollow radially disposed push rod in operative engagement with the rocker arm, a hollow cam follower in operative engagement with the push rod, and a guide for the cam follower, the push rods being located exteriorly of the cylinders in spaced relation to the latter, and the cam follower guides being located in the crankcase at the inner ends of the push rods; said lubricating system comprising means for supplying oil under pressure, means for conducting said oil to the cam followers through openings in the sides of the cam follower guides, means for conducting said oil outwardly through the cam followers to joints of all the push rods and rocker arms, oil-tight enclosures for the rocker arms at the outer ends of the cylinders, oil-tight tubes extending between the rocker arm enclosures and the cam follower guides about the push rods in open communication with said enclosures, and means for conducting by gravity back to the oil supply means oil discharged from joints of the valve-actuating mechanisms, said last mentioned means including ducts in the cam follower guides for all the cylinders located above the level of the center of the crankcase, which ducts lead downwardly from the lower ends of the push rod tubes into the crankcase, each of said cam followers being made in two spring-expanded pump-like parts between which the oil entering from the opening in the side of the cam follower guide flows and is forced intermittently under momentarily increased pressure through the outer part of the cam follower into the push rod by the contraction of said parts incident to the operation of the engine.

MARTIN J. SCHENK.